(12) United States Patent
Roehm et al.

(10) Patent No.: US 7,671,562 B2
(45) Date of Patent: Mar. 2, 2010

(54) SAFELY REMOVABLE BATTERY PACK

(75) Inventors: Heiko Roehm, Stuttgart (DE); Daniel Hirt, Kirchentellinsfurt (DE)

(73) Assignee: Robert Bosch GmbH, Stuttgart (DE)

( * ) Notice: Subject to any disclaimer, the term of this patent is extended or adjusted under 35 U.S.C. 154(b) by 347 days.

(21) Appl. No.: 11/690,946

(22) Filed: Mar. 26, 2007

(65) Prior Publication Data

US 2007/0236178 A1    Oct. 11, 2007

(30) Foreign Application Priority Data

Apr. 7, 2006    (DE) .................... 10 2006 018 006

(51) Int. Cl.
*H01M 10/46* (2006.01)
(52) U.S. Cl. ............................................. 320/114
(58) Field of Classification Search ............... 320/107, 320/110, 114, 115, 112; 429/96–100
See application file for complete search history.

(56) References Cited

U.S. PATENT DOCUMENTS

| 4,929,880 | A | * | 5/1990 | Henderson et al. | .......... 320/134 |
| 5,034,571 | A | * | 7/1991 | Galloway | .............. 191/12.2 A |
| 5,462,439 | A | * | 10/1995 | Keith | ......................... 320/109 |

FOREIGN PATENT DOCUMENTS

| EP | 1 481 769 | 12/2004 |
| JP | 63-088749 | 4/1988 |
| WO | 2007/014840 | 2/2007 |

* cited by examiner

*Primary Examiner*—Edward Tso
(74) *Attorney, Agent, or Firm*—Michael J. Stricker

(57) ABSTRACT

A battery pack for an electric appliance has a base body, a locking unit for locking the base body to the electric appliance, an actuating element for unlocking the base body, which element is intended to be actuated by a user in an actuating direction, and a removal direction in which it is possible to remove the base body after it has been unlocked from the electric appliance. The actuating direction has at least one component oriented counter to the removal direction.

7 Claims, 3 Drawing Sheets

SAFELY REMOVABLE BATTERY PACK

CROSS-REFERENCE TO A RELATED APPLICATION

The invention described and claimed hereinbelow is also described in German Patent Application DE 102006018006.2 filed on Apr. 7, 2006. This German Patent Application, whose subject matter is incorporated here by reference, provides the basis for a claim of priority of invention under 35 U.S.C. 119(a)-(d).

BACKGROUND OF THE INVENTION

The invention is based on a battery pack for an electric appliance.

A battery pack for a power tool is already known, which can be locked to the power tool. In order to unlock the battery pack from the power tool, it is provided with two pushbuttons that a user presses simultaneously, perpendicular to the removal direction of the battery pack.

SUMMARY OF THE INVENTION

A battery pack for an electric appliance in accordance with the present invention has a base body, a locking unit for locking the base body to the electric appliance, an actuating element for unlocking the base body, which element is intended to be actuated by a user in an actuating direction, and a removal direction in which the base body can be removed from the electric appliance after being unlocked.

It is advantageous if the actuating direction has at least one component that is oriented counter to the removal direction. This makes it possible to achieve a high degree of operating safety and operating convenience. In particular, it is possible to prevent an unwanted detachment of the battery pack from the base body due to an inadvertent actuation of the actuating element.

Preferably, the user actuates the actuating element with an actuating force that moves the actuating element in the actuating direction relative to the base body. This actuating force advantageously has a force component that is oriented counter to the removal direction. As a result, during this actuation, the battery pack is preferably pushed against the electric appliance, which can prevent an unwanted detachment of the battery pack from the electric appliance, even when the battery pack is unlocked from the electric appliance. The user can execute a desired detachment of the battery pack from the electric appliance by intentionally exerting a removal force on the base body in the removal direction. The removal force works counter to the actuating force. The term "actuating direction" should be understood in this context to particularly mean a direction in which the actuating element is moved in order to unlock the base body.

If the actuating direction is oriented counter to the removal direction, then it is possible to further increase operating safety.

It is also advantageous if the actuating element is situated on the base body in pivoting fashion. This makes it possible to achieve a simple actuation and a particularly simple support of the actuating element on the base body. For example, the actuating element has a pivot axle that is supported in a pivot bearing of the base body.

It is alternatively conceivable for the actuating element to be situated so that it can move in translatory fashion on the base body, which makes it possible to achieve a powerful actuating force counter to the removal direction. For example, the battery pack can be provided with two actuating elements, which are embodied, for example, as sliding buttons that are each situated on a lateral surface of the base body and can be moved counter to the removal direction for unlocking. In this instance, a lateral surface of the base body is preferably a surface, which, in the locked position, adjoins the electric appliance and is oriented at least essentially parallel to the removal direction. It is likewise conceivable for an actuating element to be provided, which is situated so that it can be moved on the base body in a pivoting and translatory fashion.

A particularly intuitive actuation of the actuating element can be achieved and conventional actuating elements can be used if the actuating element is embodied in the form of a pushbutton.

Preferably, the actuating element is situated on a removal side of the base body. The term "removal side" of the base body is understood in particular to mean a side of the base body that is oriented at least essentially perpendicular to the removal direction and is oriented toward a user's hand when the base body is being removed. This makes it possible to achieve a compact embodiment of the battery pack. It also makes it possible to grasp the base body in a particularly secure fashion during removal.

It is also possible to achieve a convenient, safe removal of the battery pack when the battery pack has a guiding means for guiding the base body in the removal direction, which guiding means is provided to support the base body on the electric appliance perpendicular to the removal direction, at least during the removal process. In this case, the battery pack is preferably embodied in the form of a sliding battery pack. To this end, the base body is suitably provided with a contact surface, which represents the entire surface of the base body that rests against the electric appliance in the locked position of the base body.

Preferably, at least most of this contact surface, particularly preferably the entire contact surface, is embodied in the form of a sliding surface for sliding on the electric appliance when the base body is being slid into the locked position. If the base body extends in a longitudinal direction, then this sliding surface preferably extends over at least most of the base body length in the longitudinal direction. The guiding means is advantageously embodied in the form of a shaped component of the sliding surface.

It is also possible to achieve a particularly reliable guidance if the guiding means is embodied in the form of a guide rail that extends in the removal direction. This makes it possible to easily produce a guidance of the battery pack, e.g. a groove/spring connection with the electric appliance.

Another advantageous embodiment involves an electric appliance, in particular a power tool with a power tool base body, e.g. a grip. This grip is advantageously equipped with a battery pack that has a base body and can be detached from the electric appliance base body, a locking unit for locking the base body to the electric appliance base body, an actuating element for unlocking the base body, which is provided for a user to actuate in an actuating direction, and a removal direction in which the base body can be removed from the electric appliance after being unlocked; the actuating direction has at least one component oriented counter to the removal direction. This makes it possible to achieve a high degree of operating safety, particularly during an operation of the electric appliance.

Other advantages ensue from the following description of the drawings. The drawings show an exemplary embodiment of the invention. The drawings, the description, and the claims contain numerous features in combination. Those skilled in the art will also consider the features individually and unite them into other meaningful combinations.

DESCRIPTION OF THE PREFERRED EMBODIMENTS

Figure 1:
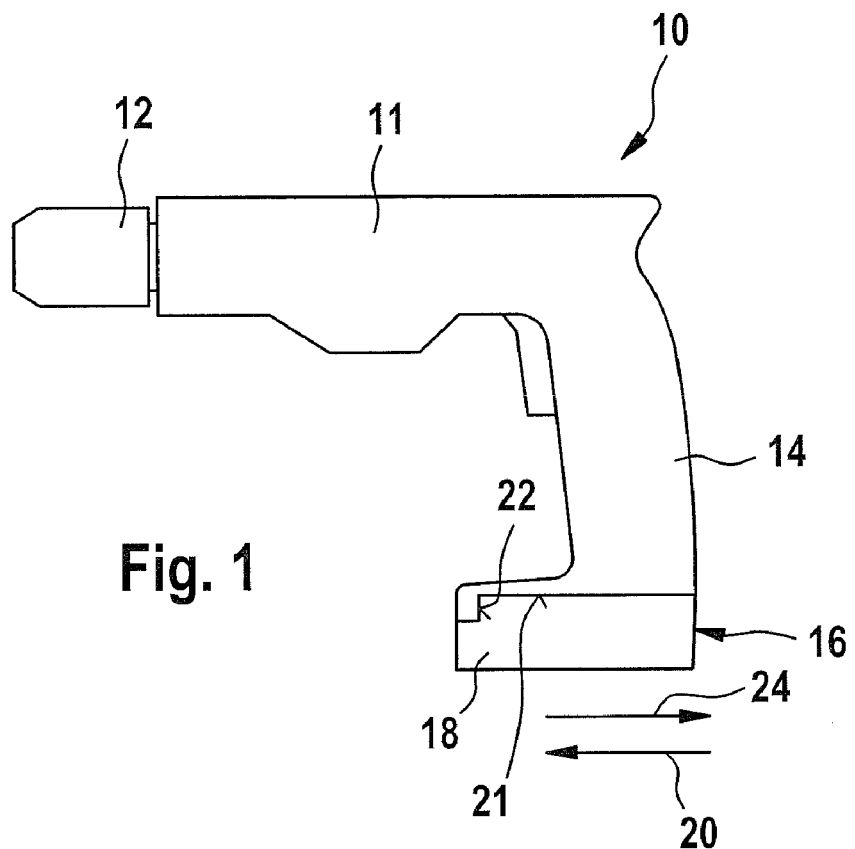
FIG. 1 shows a cordless power screwdriver with a grip and a battery pack locked to the grip in accordance with the present invention.

FIG. 1 shows an electric appliance 10 embodied in the form of a handheld power tool. The handheld power tool is embodied in the form of a cordless power screwdriver. It has an electric appliance base body 11 to which a tool holder fitting 12 is fastened. The electric appliance base body 11 also comprises a grip 14 to which a battery pack 16 is locked. The battery pack 16 has a base body 18. The battery pack 16 is embodied as a sliding battery pack. In order to lock the battery pack 16 to the grip 14, the base body 18 is slid in a sliding direction 20 along the grip 14, in fact along a lower outer surface 21 of the grip 14 until the base body 18 strikes against a surface 22 of the grip 14.

Figure 2:
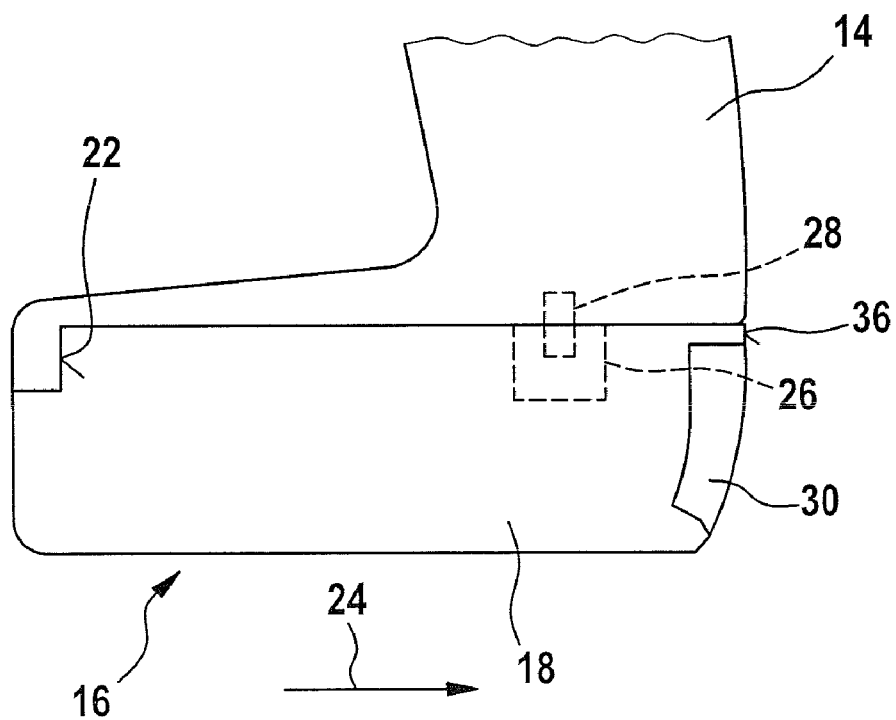
FIG. 2 is a detailed view of the grip and battery pack in the locked position in accordance with the present invention.

Once it reaches this position, the battery pack 16 is locked to the grip 14 by means of a locking mechanism 26 (FIG. 2). Through actuation of an actuating element 30 (FIG. 2), the battery pack 16 can be unlocked from the electric appliance 10. After the battery pack 16 is unlocked, the base body 18 can be detached from the electric appliance 10, in fact by sliding the base body 18 in a removal direction 24 along the lower, outer surface 21 of the grip 14. The sliding direction 20 and the removal direction 24 are oriented essentially perpendicular to the longitudinal direction of the grip 14.

FIG. 2 is a detailed view of the grip 14 in which the battery pack 16 with the base body 18 is in the locked position. The drawing shows the locking unit 26, which is provided with a locking element 28. The locking element 28 is embodied in the form of a detent mechanism that is engaged in a detent recess, not shown in detail, of the grip 14. In order to unlock the base body 18 from the grip 14, the battery pack 16 is provided with an actuating element 30. This actuating element 30 is embodied in the form of a pushbutton and is situated on the removal side 36 of the base body 18. This removal side 36 (also see FIG. 5) is a side of the base body 18 oriented perpendicular to the removal direction 24 and is oriented toward the user's hand during removal of the base body 18. The procedure for unlocking and removing the base body 18 will be described in detail in conjunction with FIGS. 3 and 4.

Figure 3:
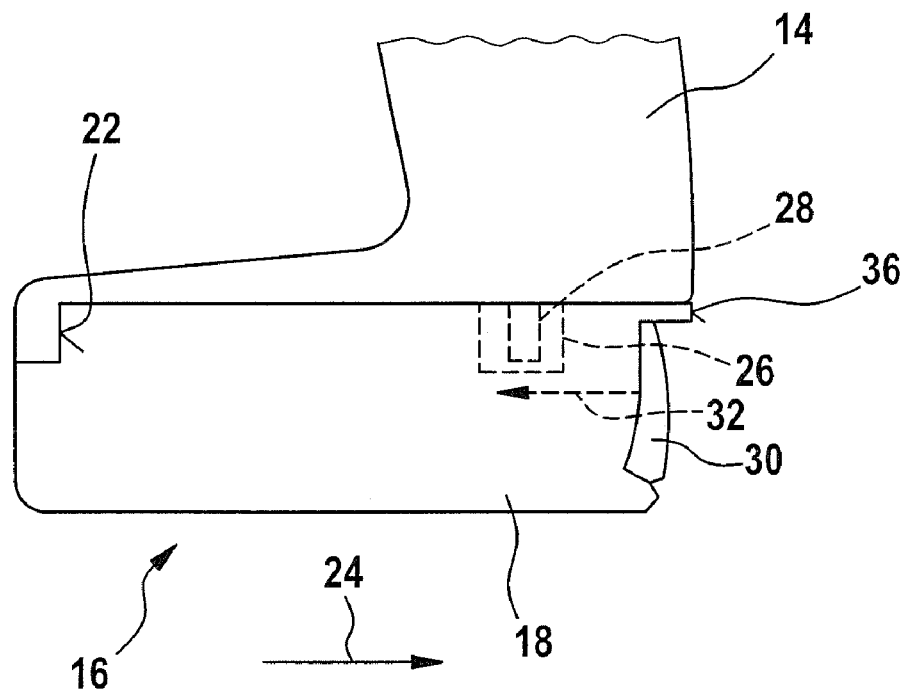
FIG. 3 shows the view from FIG. 2, with the battery pack in the unlocked position in accordance with the present invention.

FIG. 3 shows the placement of the grip 14 and the battery pack 16; the battery pack 16 rests against the grip 14 in the unlocked position. To unlock, the user actuates the actuating element 30 in an actuating direction 32. The actuating element 30 is supported on the base body 18 in pivoting fashion.

To this end, the actuating element 30 has a pivot axle (not shown) that is supported in a pivot bearing of the base body 18. When the actuating element 30 is actuated, the user exerts an actuating force in the actuating direction 32 on the surface of the actuating element 30, thus moving the actuating element 30. The actuation of the actuating element 30 with the actuating force in the actuating direction 32 causes the actuating element 30 to pivot around its pivot axle.

This pivoting motion of the actuating element 30 causes the locking element 28 of the locking unit 26 to travel out from the detent recess of the grip 14 into the unlocking position depicted in the drawing, thus unlocking the base body 18. The actuating direction 32 is oriented counter to the removal direction 24. The user therefore exerts the actuating force on the actuating element 30; this actuating force has at least one force component oriented counter to the removal direction 24. As a result, the base body 18 is pressed against the grip 14, in particular against the surface 22. If the user were to release the actuating element 30, then the spring force of a spring element that is not shown in detail would push the locking element 28 back into the locking position shown in FIG. 2.

Figure 4:
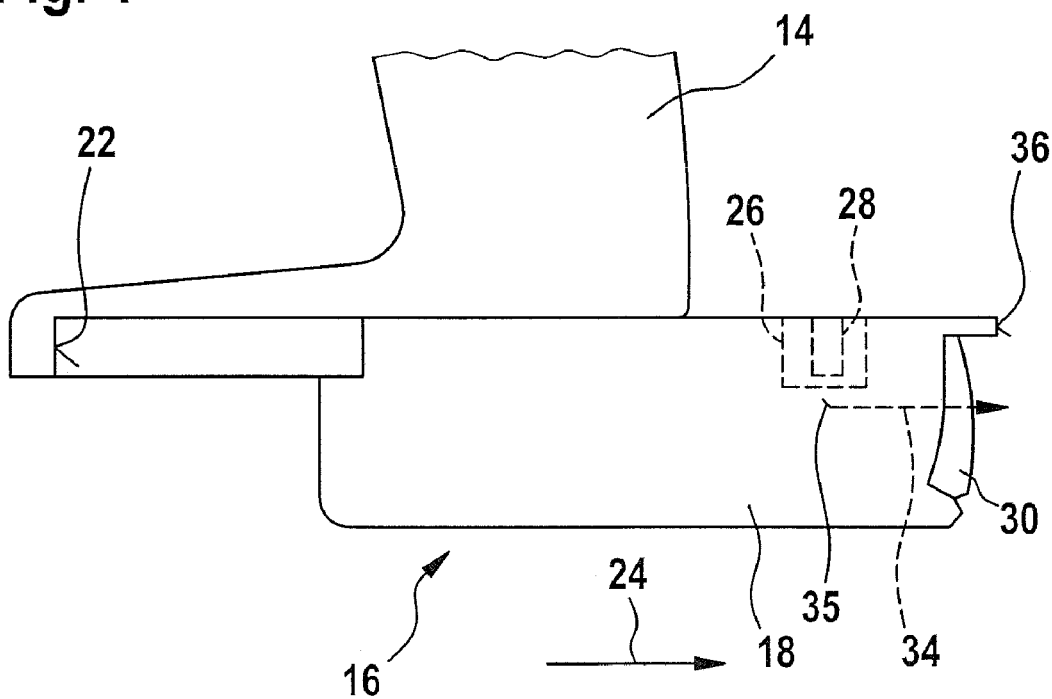
FIG. 4 shows the view from FIG. 2, with a partially removed battery pack in accordance with the present invention.

The removal of the base body 18 will be described in conjunction with FIG. 4. To this end, the user exerts a removal force 34 on the side surfaces 35 of the base body 18 in the removal direction 24, counter to the actuating force in the actuating direction 32. As a result, the base body 18 is slid along the grip 14 in the removal direction 24 until the battery pack 16 is completely removed from the grip 14.

In the event of an inadvertent actuation of the actuating element 30, an unwanted detachment of the base body 18 from the grip 14 can be advantageously avoided. An actuating force inadvertently exerted on the actuating element 30 can in fact trigger an unlocking of the base body 18 from the grip 14, but this unintentional actuating force itself keeps the base body 18 in the unlocking position shown in FIG. 3. In this case, as described above, the base body 18 is pushed against the grip 14, thus preventing a detachment of the base body 18 from the grip 14. Only when the user intentionally exerts the removal force 34 in the removal direction 24 counter to the actuating force in the actuating direction 32 is it possible to move and detach the base body 18.

Figure 5:
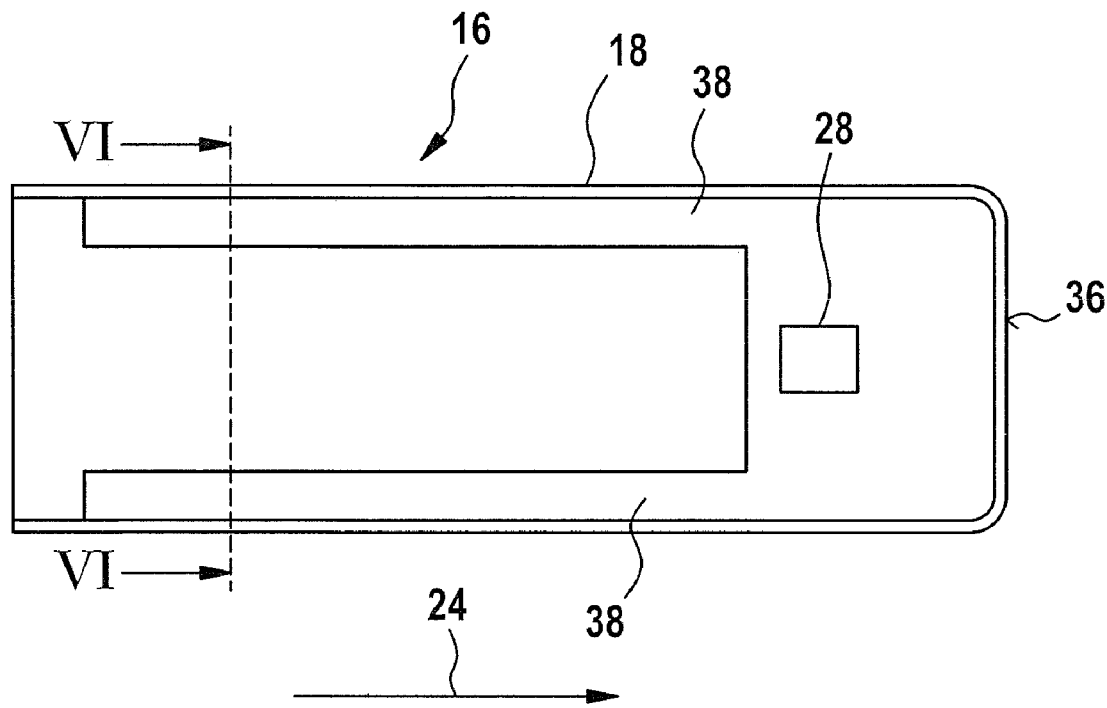
FIG. 5 is a top view of the battery pack in accordance with the present invention.

FIG. 5 is a top view of the battery pack 16. The drawing shows the base body 18 with the removal side 36 and the locking element 28 of the locking unit 26. In order to guide the base body 18 as it is being slid along the lower outer surface 21 of the grip 14, the base body 18 is provided with guiding means that are embodied in the form of guide rails 38. These guide rails 38 each extend in the removal direction 24 over most of the length of the base body.

Figure 6:
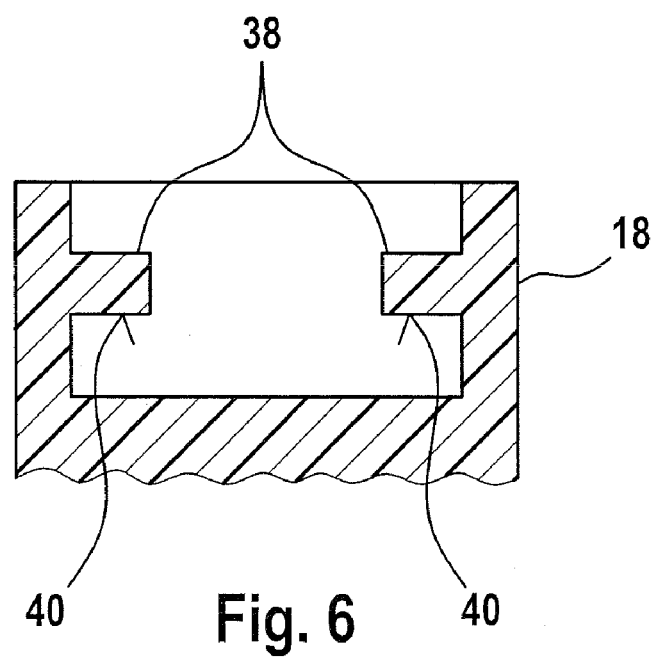
FIG. 6 is a sectional view of the battery pack in accordance with the present invention.

FIG. 6 is a sectional depiction of the base body 18 along a line VI-VI (FIG. 5). The drawing shows the base body 18 onto which the guide rails 38 are formed. The lower surfaces of the guide rails 38 each constitute a support region 40 by means of which the base body 18 is supported on the grip 14 perpendicular to the removal direction 24 as the base body 18 is being guided along the outer surface 21.

It will be understood that each of the elements described above, or two or more together, may also find a useful application in other types of constructions differing from the type described above.

While the invention has been illustrated and described as embodied in a battery pack, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A battery pack for an electrical appliance, comprising:
   a base body;
   a locking unit for locking said base body to the electrical appliance; and
   an actuating element pivotably coupled to the base body for unlocking said base body, said actuating element being actuatable by a user in an actuating direction having at least one component that is oriented counter to a removal direction for removing the base body from the electrical appliance after unlocking the base body from the electrical appliance.

2. A battery pack as defined in claim 1, wherein said actuating element is configured so that the actuating direction is oriented counter to the removal direction.

3. A battery pack as defined in claim 1, wherein said actuating element is configured as a pushbutton.

4. A battery pack as defined in claim 1, wherein said base body has a removal side, said actuating element being situated on said removal side of said base body.

5. A battery pack as defined in claim 1; and further comprising guiding means for guiding said base body in the removal direction, said guiding means being provided for supporting said base body on the electrical appliance perpendicular to the removal direction, at least during a removal process.

6. A battery pack as defined in claim 5, wherein said guide means is configured as a guide rail that extends in the removal direction.

7. An electrical appliance, comprising:
   an electrical appliance base body; and
   a battery pack that is detachable from said electrical appliance base body, said pack including a base body, a locking unit for locking said base body to the electrical appliance, an actuating element pivotably coupled to the base body for unlocking said base body, said actuating element being actuated by a user in an actuating direction having at least one component that is oriented counter to a removal direction for removing the base body from the electrical appliance after unlocking the base body from the electrical appliance.

* * * * *